Patented June 3, 1952

UNITED STATES PATENT OFFICE 2,599,145

TRIAZINE DERIVATIVES OF DIPHENYL SULFONES, SULFOXIDES, AND SULFIDES, AND METHODS OF PRODUCTION

Ruth H. Vogel, New York, N. Y.

No Drawing. Application August 6, 1951, Serial No. 240,606

6 Claims. (Cl. 260—239.7)

This invention relates to compounds of the general formula

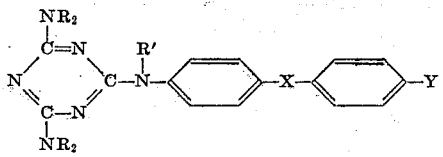

in which X is a member of the group consisting of $SO_2$, SO, and S, R is a member of the group consisting of hydrogen and a substituted or unsubstituted hydrocarbon radical, R' is a member of the group consisting of hydrogen and an alkyl radical, and Y is a member of the group consisting of a substituted or unsubstituted amino radical and $NO_2$; and to the process of making them. These new products are found to be effective antibacterial agents.

It is the object of the present invention to provide new and useful organic compounds. It is a further object to provide new and therapeutic compounds active against bacteria, particularly *Mycobacterium tuberculosis*. Other objects will appear hereinafter.

It is commonly believed that antibacterial compounds of the general type of N-substituted derivatives of 4,4'-diaminodiphenyl sulfone and related compounds owe their activity to removal of the substituents and liberation of the active parent amino compound by catabolic processes; N-heterocyclic-substituted compounds of this type, however, are not considered to be thus cleavable and thought to be inactive per se (see, for example, E. H. Northey, The Sulfonamides and Allied Compounds, Reinhold Publishing Corporation, New York, 1948, pp. 341, 344). Contrary to expectations, it has been found that the N-heterocyclic-substituted derivatives of 4,4'-diaminodiphenyl sulfone and related compounds described herein are powerful antibacterial agents; for example, p-(2,4-diamino-s-triazinyl-6)-aminophenyl p'aminophenyl sulfone is even more active against *Mycobacterium tuberculosis* than 4,4'-diaminodiphenyl sulfone.

According to the present invention, the new compounds are generally obtained by reacting unsubstituted or appropriately substituted 2,4-diamino-6-chloro-s-triazine with a 4,4'disubstituted diphenyl sulfone, or analogous sulfoxide or sulfide, in which at least one of the substituents is an amino group having at least one hydrogen atom capable of replacement. The invention is illustrated by the following examples without being restricted thereto:

*Example 1.*—0.16 mole (40 g.) 4,4'-diaminodiphenyl sulfone is dissolved in 1.6 l. hot water containing 48 ml. concentrated hydrochloric acid. 0.16 mole 2,4-diamino-6-chloro-s-triazine is added and the mixture is boiled for 10 minutes. The resulting clear solution, on chilling to 13° C., deposits the dihydrochloride of bis [p-(2,4-diamino-s-triazinyl-6)-aminophenyl] sulfone, which is removed by filtration and has a dry weight of 19.1 g. The filtrate, on keeping at 5° C. for 72 hours, yields the dihydrochloride of p-(2,4-diamino-s-triazinyl-6)-aminophenyl p'-aminophenyl sulfone, which is isolated by filtration and has a dry weight of 22.4 g. The formation of this product may be represented as follows:

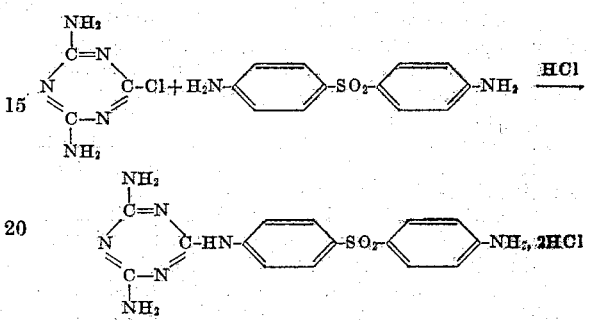

The product is recrystallized by dissolving it in 1 l. boiling water, adding 500 ml. concentrated hydrochloric acid, and chilling. The resulting white material is filtered, washed with ice-cold 4 normal hydrochloric acid and acetone, dried in vacuo, and weighs 21.4 g.

12 g. of this dihydrochloride are dissolved in 600 ml. hot water. To the resulting clear solution is added with stirring a solution of 4.8 g. anhydrous sodium carbonate in 120 ml. water. A soft precipitate of p-(2,4-diamino-s-triazinyl-6)-aminophenyl p'-aminophenyl sulfone in the form of the free base is obtained which hardens on chilling. After filtering and washing with water, the product is further purified by grinding with water to form a thin paste, filtering again, washing with water, and drying in vacuo. The yield is 8.8 g. The free base is a white powder which is only slightly soluble in water, sparingly soluble in dilute hydrochloric acid, and soluble in propylene glycol. When sodium nitrite is added to a cold acid solution of this product, a diazonium salt is formed. The diazotized product couples with R-salt in the presence of alkali and with other compounds capable of undergoing a coupling reaction. When heated rapidly, the base melts at approximately 240–245° C.

*Example 2.*—A mixture of 2.48 g. (0.01 mole) 4,4'-diaminodiphenyl sulfone, 100 ml. water, 3 ml. concentrated hydrochloric acid, and 2.91 g. (0.02 mole) 2,4-diamino-6-chloro-s-triazine is boiled for 10 minutes and then cooled. The resulting white precipitate of the dihydrochloride of bis[p-(2,4-diamino-s-triazinyl-6)-aminophenyl] sulfone is filtered on paper, washed with dilute hydrochloric acid and acetone, and is dried in vacuo. The product, formed in high yield has the formula

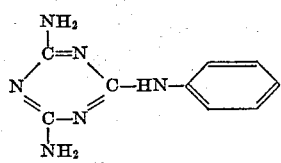

It may be recrystallized from dilute hydrochloric acid substantially as described in Example 1. It is converted to the corresponding free base bis[p-(2,4-diamino-s-triazinyl-6)-aminophenyl] sulfone, by the action of an aqueous solution of sodium carbonate or another suitable basic compound, substantially as described in Example 1. This free base is a white powder which does not melt at 250° C.

*Example 3.*—0.16 mole 4-amino-4'nitrodiphenyl sulfone is reacted with 0.16 mole 2,4-diamino-6-chloro-s-triazine substantially as described in Example 1. The resulting product, the monohydrochloride of p-(2,4-diamino-s-triazinyl-6)-aminophenyl p'-nitrophenyl sulfone, is reducible by the action of a suitable reducing agent, for example, by heating with an excess of tin in dilute hydrochloric acid, to form p-(2,4-diamino-s-triazinyl-6)-aminophenyl p'-aminophenyl sulfone in the form of a salt.

*Example 4.*—4,4'-diaminodiphenyl sulfoxide is reacted with 2,4-diamino-6-chloro-s-triazine substantially as described in Example 1.

*Example 5.*—4,4'-diaminodiphenyl sulfide is reacted with 2,4-diamino-6-chloro-s-triazine substantially as described in Example 1.

*Example 6.*—4-amino-4'-nitrodiphenyl sulfoxide is reacted with 2,4-diamino-6-chloro-s-triazine substantially as described in Example 3.

*Example 7.*—4-amino-4'-nitrodiphenyl sulfide is reacted with 2,4-diamino-6-chloro-s-triazine substantially as described in Example 3.

In Examples 1 and 2, the ratio of 2,4-diamino-6-chloro-s-triazine to 4,4'-diaminodiphenyl sulfone may be less than 1 or greater than 2 respectively. In the above examples, instead of hydrochloric acid, another mineral acid such as sulfuric acid, or an organic acid such as tartaric acid, may be used and the amount of acid may be varied. Instead of carrying out the reactions described at the boiling point, another temperature may be used, preferably above 60° C. The duration of the heating period may be varied within wide limits.

In the above examples, instead of unsubstituted 2,4-diamino-6-chloro-s-triazine there may be used a 2,4-diamino-6-chloro-s-triazine substituted by one or more lower alkyl, alkenyl, hydroxyalkyl, and carboxyalkyl radicals, for example, 2-amino-4-propylamino-6-chloro-s-triazine, 2-amino-4-allylamino-6-chloro-s-triazine, 2-amino-4-(2'-hydroxyethylamino)-6-chloro-s-triazine, 2-amino-4-carboxymethylamino-6-chloro-s-triazine, 2,4-di-(methylamino)-6-chloro-s-triazine, and 2,4-di-(ethylamino)-6-chloro-s-triazine, giving products analogous to those of the above examples.

Instead of using as reactants the 4,4'-disubstituted diphenyl sulfones, sulfoxides and sulfides having one or two unsubstituted amino groups set forth above, there may be used such sulfones, sulfoxides and sulfides, in which one or both of the amino groups are substituted by one or more lower alkyl radicals, including among others 4-amino-4'-methylaminodiphenyl sulfone, 4-amino-4'-ethylaminodiphenyl sulfone, 4-amino-4'-butylaminodiphenyl sulfone, 4,4'-di-(methylamino)-diphenyl sulfone, 4-nitro-4'-ethylaminodiphenyl sulfone, and 4-nitro-4'-methylaminodiphenyl sulfoxide, giving products analogous to those of the above examples.

The invention may be variously otherwise embodied within the scope of the appended claims.

I claim:

1. A compound having the formula

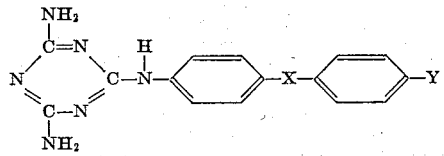

in which X is a radical selected from the group consisting of $SO_2$, SO, and S, and Y is a radical selected from the group consisting of $NH_2$, $NO_2$, and 2,4-diamino-s-triazinyl-6-amino.

2. The compound p-(2,4-diamino-s-triazinyl-6)-aminophenyl p'-aminophenyl sulfone.

3. The compound bis[p-(2,4-diamino-s-triazinyl-6)-aminophenyl] sulfone.

4. The process which comprises reacting 2,4-diamino-6-chloro-s-triazine with an aromatic amino compound of the general formula

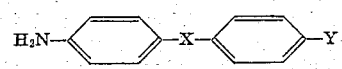

in which X is a radical selected from the group consisting of $SO_2$, SO, and S, and Y is a radical selected from the group consisting of $NH_2$ and $NO_2$, by heating said reactants in aqueous solution in the presence of an acid, thereby causing substitution of at least one amino group of said aromatic amino compound by one 2,4-diamino-s-triazinyl-6 radical with elimination of hydrochloric acid.

5. The process which comprises reacting one molar equivalent of 2,4-diamino-6-chloro-s-triazine with substantially one molar equivalent of 4,4'-diaminodiphenyl sulfone by heating said reactants in aqueous solution at the boiling point in the presence of hydrochloric acid, and recovering the product, p-(2,4-diamino-s-triazinyl-6)-aminophenyl p'-aminophenyl sulfone.

6. The process which comprises reacting two molar equivalents of 2,4-diamino-6-chloro-s-triazine with substantially one molar equivalent of 4,4'-diaminodiphenyl sulfone by heating said reactants in aqueous solution at the boiling point in the presence of hydrochloric acid, and recovering the product, bis[p-(2,4-diamino-s-triazinyl-6)-aminophenyl] sulfone.

RUTH H. VOGEL.

REFERENCES CITED

The following references are of record in the file of this patent:

UNITED STATES PATENTS

| Number | Name | Date |
|---|---|---|
| 2,481,758 | Kaiser et al. | Sept. 13, 1949 |

FOREIGN PATENTS

| Number | Country | Date |
|---|---|---|
| 593,021 | Great Britain | Oct. 7, 1947 |